United States Patent [19]

Bender

[11] Patent Number: 5,698,668
[45] Date of Patent: Dec. 16, 1997

[54] MODIFIED NATURAL-RESIN ACID ESTERS, PROCESSES FOR THEIR PREPARATION, AND THEIR USE AS BINDER RESINS IN PRINTING INKS

[75] Inventor: Albert Bender, Mainz, Germany

[73] Assignee: Vianova Resins GmbH, Mainz-Kastel, Germany

[21] Appl. No.: 660,173

[22] Filed: Jun. 3, 1996

[30] Foreign Application Priority Data

Jun. 3, 1995 [DE] Germany ............... 195 20 530.8

[51] Int. Cl.$^6$ ............... C09F 1/04; C09D 11/08; C09D 17/00; C09B 67/20
[52] U.S. Cl. ............... 530/200; 530/203; 530/204; 530/205; 530/207; 530/210; 530/211; 530/212; 530/215; 530/216; 530/226; 530/227; 530/230; 530/232
[58] Field of Search ............... 530/200, 203, 530/204, 205, 207, 210, 211, 212, 215, 216, 226, 227, 230, 232

[56] References Cited

U.S. PATENT DOCUMENTS

| | | | |
|---|---|---|---|
| 3,880,788 | 4/1975 | Rudolphy | 527/603 |
| 4,207,219 | 6/1980 | Rudolphy | 527/603 |
| 4,857,624 | 8/1989 | DeBlasi et al. | 528/129 |
| 4,966,945 | 10/1990 | Drawert et al. | 525/113 |
| 5,376,719 | 12/1994 | Bender | 525/54.4 |
| 5,405,932 | 4/1995 | Bender et al. | 528/104 |
| 5,427,612 | 6/1995 | Bender | 106/30 |
| 5,556,454 | 9/1996 | Bender | 106/218 |

FOREIGN PATENT DOCUMENTS

| | | |
|---|---|---|
| 0 615 987 | 9/1994 | European Pat. Off. . |
| 0 641 811 | 3/1995 | European Pat. Off. . |
| 0 666 294 | 8/1995 | European Pat. Off. . |

OTHER PUBLICATIONS

Derwent Publication Ltd., London, GB; AN 87–358757/51, JP-A-62 260 810 (Toyo Ink Mfg. Co.) Nov. 13, 1987.
Chemical Abstract 120:324917, 1994.
Chemical Abstract 120:220578, 1994.
Chemical Abstract 108:152315, 1988.
Chemical Abstract 105:44956, 1987.
Chemical Abstract 107:136063, 1988.
Chemical Abstract 120:299598, 1994.
Derwent Publications Ltd., London, GB; Class A21, AN 93–374744 XXPO02016936 & JP-A-05 279 613 (Toyo Ink Mfg. Co.), 26 Oct. 1993.

*Primary Examiner*—Nathan M. Nutter
*Attorney, Agent, or Firm*—Foley & Lardner

[57] ABSTRACT

Toluene-soluble modified natural-resin acid esters which can be prepared by reacting at least one compound from each of the component groups: A) natural resins or natural-resin acids; B) α,β-ethylenically unsaturated carboxylic acids or their anhydrides; C) phenols which are polyfunctional with respect to oxo compounds; D) aldehydes or aldehyde acetals; E) alcohols having at least two hydroxyl groups; and, if desired, further compounds from the substance groups: F) fatty acids or fatty acid esters; G) ethylenically unsaturated monomers; H) ethylenically unsaturated hydrocarbon resins in the presence of: I) monovalent or divalent metal compounds or mixtures thereof at a temperature of from 100° to 300 °C., with elimination of water, to an acid number of less than 100 mg of KOH/g of resin, and then reacting the resulting products with: J) carboxylic acids which contain at least two carboxyl groups and are not α,β-ethylenically unsaturated, or their anhydrides, in the temperature range from 200° to 300 °C.; are suitable as binder resins for the intaglio printing of illustrations.

13 Claims, No Drawings

MODIFIED NATURAL-RESIN ACID ESTERS, PROCESSES FOR THEIR PREPARATION, AND THEIR USE AS BINDER RESINS IN PRINTING INKS

BACKGROUND OF THE INVENTION

1. Field of the Invention

The invention relates to modified natural-resin acid esters, to processes for their preparation and products made containing the modified resins. More specifically, the invention relates to modified natural resin acid ester formed by reaction of natural resins with α, β-unsaturated carboxylic acids or their anhydrides, phenols, aldehydes, condensation catalysts, esterifying agents and modifying agents, followed by crosslinking reaction with carboxylic acids containing at least two acid groups, or else with their anhydrides. The novel compounds can be used with advantage as binder resins for printing inks for the intaglio printing of illustrations.

2. Description of Related Art

In the intaglio printing of illustrations, toluene-containing printing inks are predominantly employed. Such printing inks can, as is known, be prepared by pigmentation of a varnish which is obtained by dissolving appropriate binder resins in toluene with the addition of customary auxiliaries. The function of the binder resin in this use is generally to anchor the pigment to the material to be printed.

In general, toluene-containing printing inks are produced industrially by first synthesizing pigment dispersions or pigment concentrates which when after dilution with toluene or combining with further binder systems, give the ready-to-use inks. In the production of these intermediates it is particularly important to provide the pigment in the dispersion phase with a sufficient quantity of resin for optimum wetting, but without reaching a viscosity which is too high.

Exceeding the optimum viscosity can impair the desired flowability of the dispersion or may even lead to inhomogeneities. But a reduction in the viscosity by an excessive lowering of the concentration of the resin results in unsatisfactory dispersion. For economic reasons it is, of course, desirable to produce a printing ink which has as low as possible a resin content while nevertheless possessing adequate printing properties. For economic reasons, accordingly, there is great deal of interest in producing printing inks in such a way that, despite a minimal content of binder resins, they possess good printability and printing performance.

Binders employed for printing inks are modified natural-resin acid esters. The preparation of modified natural-resin acid esters from natural resins, which may also be partially modified with α,β-olefinically unsaturated carboxylic acids or their anhydrides, and from phenol-aldehyde condensation products, esterifying agents and other modifying agents, such as fatty acids or hydrocarbon resins, and their use as binder resins for printing inks are known. To prepare these phenolic resin-modified natural-resin acid esters, salts of divalent or monovalent metals are usually required as catalyst.

EP-A 0 548 506 describes the preparation of oil-soluble, phenolic resin-modified natural-resin acid esters by modification of natural-resin acids, which are reacted prior to the actual modification reaction in part with α,β-olefinically unsaturated acids or their anhydrides, for example, maleic anhydride, in the presence of magnesium compounds. These binder resins are suitable in inks for offset printing but cannot be used in toluene-containing inks for the intaglio printing of illustrations.

Furthermore, EP-A 0 615 987 proposes calcium compounds or zinc compounds as catalysts for the modification of natural resins with phenols, aldehydes and polyols. The resins are synthesized without the use of α,β-olefinically unsaturated carboxylic acids or their anhydrides. Although such systems are suitable for intaglio printing with toluene, the change in viscosity with concentration in toluene is so steep that they provide only limited possibilities for use in pigment dispersions and pigment concentrates.

Similar behavior is shownby the products described in U.S. Pat. No. 3,880,788, which are prepared in the presence of divalent metal compounds from styrenized rosin which is reacted, if desired, prior to the actual modification reaction with phenolic resins and esterifying agents, in part with maleic anhydride as well.

U.S. Pat. No. 4,207,219 discloses binder resins for intaglio printing inks which are prepared from natural-resin acids modified with α,β-olefinically unsaturated dicarboxylic acids, for example maleic anhydride, and from calcium compounds, polyalcohols and resols. The products, however, are of relatively low viscosity and therefore give resin-rich inks which are not advantageous.

U.S. Pat. No. 4,857,624 describes the modification of rosin, which has been reacted with fumaric acid, with diphenylolpropane, formaldehyde and pentaerythritol in the presence of magnesium oxide. However, the products have the disadvantage that, when prepared in the resin melt, unwanted crystallization may occur. The resulting products are insoluble in toluene and therefore render the product unusable.

A description has also been given of the heating of natural resins or derivatives thereof with aliphatic carboxylic acids or acid-modified alkyd resins, phenols and formaldehyde in the presence of acidic catalysts followed by the conversion of the resulting polycondensation product to the resinate using metal oxides or metal hydroxides (Derwent Abstract No. 87-358757/51 (JP-A 260 810/87)). As is known, however, the use of resinates as binders leads to inks which are undesirably rich in resin.

Patent application EP-A 0 619 331 proposes alkali metal compounds as catalyst for the reaction of cyclopentadiene compounds with natural-resin acids, phenols and aldehydes. The unesterified cyclopentadiene resins obtained are well suited as binders for offset printing inks but not for the intaglio printing of illustrations.

In EP Application No. 95101393.7, it has also been proposed to use lithium compounds as catalysts for the preparation of phenolic resin-modified natural-resin acid esters. In this case, the natural-resin acids can be reacted in part with α,β-olefinically unsaturated carboxylic acids or their anhydrides prior to the actual modification. Although the resins show an advantageous flat viscosity versus concentration curve, the gloss of inks formulated with these resins is deficient.

It is also known that natural resins can be reacted with phenol and formaldehyde and also glycerol in the presence of magnesium oxide and basic lithium compounds to give oil-soluble resins (Chemical Abstract No. 120:324917 and 120:299598 (CN-A 1 077 462 and CN-A 1 077 461)). Although these binders are suitable for the dispersion of pigments for offset printing inks, they are not suitable for dispersing pigments in inks for the intaglio printing of illustrations.

A proposal has also been made to react natural resins or natural-resin acids, which are not modified with α,β- unsaturated acids or anhydrides, with polybasic aliphatic acids or phthalic acids or anhydrides thereof, phenolic resins or their components, and polyhydric alcohols. These binder resins, however, can be used only for offset printing inks (Chemical Abstract No. 120:220578 (JP-A 279 613/93)). The same applies to binder resins based on rosin or cyclopentadiene which are modified with adipic acid or maleic anhydride (Chemical Abstract No. 108:152315 (JP-A 265 375/87)).

From DE-A 36 16 824 it is known to mix phenolic resin-modified rosins with alkyd resins synthesized using the polybasic isophthalic acid and to employ the mixtures in inks for offset printing.

It is also known to subject phenolic resin-modified rosins to high-temperature condensation with alkyd resins based on isophthalic acid. These cocondensation products, however, can only be used for offset printing inks (Chemical Abstract No. 105:44956 (JP-B 059 269/85)).

Finally, natural resins containing no maleic anhydride, and phenolic resins, polyhydric alcohols, (semi)drying oils and polybasic carboxylic acids have also been reacted to form binder resins for offset printing inks (Chemical Abstract No. 107:136063 (JP-A 018 484/87)).

The development of particularly high-speed printing presses and the trend toward printing not only coated papers but also uncoated papers having increased absorptivity, places particularly high demands on the quality of binder resins for the intaglio printing of illustrations. In particular, they are required to give the ink film a good appearance on the material being printed. Binder resins together with pigment should not diffuse into the interior, since this is associated with loss of gloss and reduced abrasion resistance. The increased demands due to these and other factors cannot always be satisfactorily met with the known binder resins.

SUMMARY OF THE INVENTION

One object of the invention is to overcome the disadvantages of the known art described above.

Another object of the present invention is to provide novel binder resins which have a relatively flat viscosity versus concentration curve in toluene, provide good pigment wetting, and permit the production of low-solids illustration intaglio printing inks with high gloss and with low strike-through of the ink during printing.

Another object of the present invention is to provide toluene-soluble modified natural resin esters which can be used as binder resins, for example, in ink compositions. Still another object of the present invention is to provide a process for the production toluene-soluble modified resin esters. Yet another object of the present invention is to provide a binder system which includes the toluene-soluble modified natural resin esters. Still another object of the present invention is to provide an ink composition for printing which includes binders made from the toluene-soluble modified natural resin esters of the present invention.

In accomplishing the foregoing objects, there has been provided according to one aspect of the invention, a toluene-soluble modified natural-resin acid ester, produced by a process which comprises:

reacting at least one compound from each of the component groups A-E and optionally F-H, in the presence of component I, wherein the reaction takes place at temperature of from 100° to 300 ° C., with elimination of water, to an acid number of less than 100 mg of KOH/g of resin; and further reacting the resulting products with at least one compound from component group J at a temperature of from 200° to 300 ° C., wherein component groups A-J are defined as A) natural resins or natural-resin acids, B) $\alpha,\beta$-ethylenically unsaturated carboxylic acids or their anhydrides, C) phenols which are polyfunctional with respect to oxo compounds, D) aldehydes or aldehyde acetals, E) alcohols having at least two hydroxyl groups, F) fatty acids or fatty acid esters, G) ethylenically unsaturated monomers, H) ethylenically unsaturated hydrocarbon resins, I) monovalent or divalent metal compounds or mixtures thereof, and J) carboxylic acids or their anhydrides which contain at least two carboxyl groups and are not $\alpha,\beta$-ethylenically unsaturated.

According to another aspect of the invention, there has been provided a process for the preparation of the toluene-soluble modified natural-resin acid esters described above, which comprises:

reacting at least one compound from each of the component groups A-E and optionally F-H, in the presence of component I, wherein the reaction takes place at a temperature of from 100° to 300 ° C., with elimination of water, to an acid number of less than 100 mg of KOH/g of resin; and further reacting the resulting products with at least one compound from component group J at a temperature of from 200° to 300 ° C., wherein component groups A-J and their amounts are:

from 30 to 95% by weight of component group A which are natural resins or natural-resin acids, from 0.1 to 20% by weight of component group B which are $\alpha,\beta$-ethylenically unsaturated carboxylic acids, or their anhydrides, from 1 to 45% by weight of component group C which are phenols which are polyfunctional with respect to oxo compounds, from 1 to 20% by weight of component group D which are aldehydes or aldehyde acetals, wherein component groups C and D may optionally be wholly or partially present as condensation products prepared separately from compounds from component groups B and C, from 1 to 20% by weight of component group E which are alcohols having at least two hydroxyl groups, from 0 to 40% by weight of component group F which are fatty acids or fatty acid esters, from 0 to 30% by weight of component group G which are unsaturated monomers, from 0 to 30% by weight of component group H which are hydrocarbon resins, from 0.01 to 5% by weight, calculated as oxide, of component group I which are monovalent and/or divalent metal compounds, and J) carboxylic acids which contain at least two carboxyl groups and are not $\alpha,\beta$-ethylenically unsaturated, or their anhydrides.

According to still another aspect of the present invention there has been provided a binder system which includes the toluene-soluble modified natural resin esters. According to another aspect of the invention, there has been provided pigment dispersions or pigment concentrates which includes toluene-soluble modified natural resin esters. Yet another aspect of the present invention provides a ink composition which is useful for intaglio printing of illustrations which includes pigments and the toluene-soluble modified natural resin esters.

Further objects, features and advantages of the present invention will become apparent from the detailed description of the preferred embodiment which follows.

DETAILED DESCRIPTION OF THE PREFERRED EMBODIMENTS

The objects of the invention have been achieved in an unexpected way, in connection with the production of printing-ink resins for the intaglio printing of illustrations, on the basis of phenolic resin-modified natural-resin acid esters, by first of all using natural resins which are modified with α,β-olefinically unsaturated carboxylic acids or their anhydrides but then, after the modification reaction with phenolic resin, esterifying agent and further modifying agents, additionally reacting the resulting resin melts by the addition of carboxylic acids which contain at least two carboxyl groups, or their anhydrides, the latter compounds not, however, constituting α,β-unsaturated carboxylic acids or their anhydrides.

Natural resins and resin acids include all naturally occurring resins and resin acids which can be collected from trees, especially pine trees, and their roots. Such resins include, for example, rosin (colophony), tall resin, wood resins and tree resins.

The present invention provides toluene-soluble modified natural-resin acid esters which can be prepared by reacting at least one compound from each of the following component groups A-E and optionally F-H in the presence of I) monovalent or divalent metal compounds or mixtures thereof at a temperature of from 100° to 300 °C., preferably from 130° to 280 °C., with elimination of water, to an acid number of less than 100 mg of KOH/g of resin. Components A-H are defined as:

A) natural resins or natural-resin acids,

B) α,β-ethylenically unsaturated carboxylic acids or their anhydrides,

C) phenols which are polyfunctional with respect to oxo compounds,

D) aldehydes or aldehyde acetals, and

E) alcohols having at least two hydroxyl groups and, if desired, further compounds from the following groups F) fatty acids or fatty acid esters, G) ethylenically unsaturated monomers, and H) ethylenically unsaturated hydrocarbon resins.

The resulting products are then reacted with

J) carboxylic acids which contain at least two carboxyl groups and are not α,β-ethylenically unsaturated, or their anhydrides, in the temperature range from 200° to 300 °C.

Compounds preferably used as compounds from groups A) to J) include:

A) rosin, wood rosin, tall resin and disproportionated or partially hydrogenated or dimerized natural resin of any origin; natural resins or natural-resin acids containing minor quantities of other terpenes;

B) α,β-ethylenically unsaturated carboxylic acids or their anhydrides, especially fumaric acid, maleic acid, maleic anhydride, itaconic acid, cinnamic acid, acrylic acid and methacrylic acid;

C) monocyclic phenols, especially phenol itself, ($C_1$–$C_{12}$)-alkylphenols, aryl- or aralkylphenols, cresols, 1,3,5-xylenols, isopropyl-, p-tert-butyl-, amyl-, octyl-, nonylphenol, phenylphenol, cumylphenol and polycyclic phenols, especially diphenylolpropane, and also addition products of phenols with ethylenically unsaturated monomers, such as α-methylstyrene, α-chlorostyrene, vinyltoluene, and cyclopentadiene;

D) aliphatic ($C_1$–C)-aldehydes, especially formaldehyde in its various monomeric, oligomeric and polymeric forms, acetaldehyde, butyraldehyde, isobutyraldehyde, and also benzaldehyde, furfural, and glyoxal;

E) bifunctional alcohols, especially glycols, tri-functional alcohols, for example trimethylolethane, trimethylolpropane, glycerol, tetrafunctional alcohols, for example pentaerythritol, pentafunctional alcohols, for example dimerized trimethylolpropane, and hexafunctional alcohols, for example dimerized pentaerythritol;

F) fatty acids of animal or vegetable origin or obtained by refining, and also fatty acid esters, especially fatty acid glycerol esters, in the form of vegetable or animal oils, for example tall oil, cotton seed oil, soya oil, linseed oil, tung oil, fish oil, and coconut oil;

G) aromatic vinyl compounds, especially styrene, α-methylstyrene, and indene;

H) polymers or oligomers of singly and/or multiply ethylenically unsaturated ($C_5$–$C_9$)-hydrocarbons, in particular those from the group consisting of isoprene, cyclopentadiene, indene, coumarone and styrene, or copolymers of ethylenically unsaturated hydrocarbon resins with natural resins or natural-resin acids;

I) compounds of lithium, sodium, potassium, magnesium, calcium or zinc, or mixtures of these compounds, especially oxides, hydroxides, carbonates, hydrogen carbonates, and acetates; and J) aliphatic dicarboxylic acids, for example, oxalic acid, succinic acid, alkyl-substituted succinic acids such as dodecylsuccinic acid, adducts of maleic anhydride or fumaric acid with natural-resin acids of tree resin, for example maleopimaric acid, adducts of maleic anhydride with unsaturated fatty substances, for example the products with methyl 10-undecenoate, malonic acid, adipic acid, dimerized and trimerized fatty acids, tartaric acid, citric acid, cyclic carboxylic acids, for example 5-norbornene-2,3-dicarboxylic anhydride, 1,2,3,6-tetrahydrophthalic anhydride, aromatic carboxylic acids, for example phthalic anhydride, terephthalic acid, isophthalic acid, and trimellitic acid.

The above compounds are intended to be exemplary only. It is to be understood that other components within the broad definition of each group can also be used according to the present invention.

The invention also provides for the preparation of toluene-soluble, phenolic resin-modified natural-resin acid esters by reaction of components A) to J). Toluene-soluble in this context means that solutions in toluene can be obtained with a mass fraction of solute of at least 5% and an insoluble residue of less than 0.5%, preferably of less than 0.1%. The proportion of the individual components, based on the overall quantity of components employed, is preferably as stated below:

From 30 to 95% by weight, preferably from 40 to 90% by weight, in particular from 50 to 80% by weight, of natural resins or natural-resin acids from component group A).

From 0.1 to 20% by weight, preferably from 2 to 10 by weight, of α,β-ethylenically unsaturated carboxylic acids, or their anhydrides, from component group B).

From 1 to 45% by weight, preferably from 5 to 40% by weight, in particular from 10 to 35% by weight, of phenols from component group C).

From 1 to 20% by weight, preferably from 3 to 10% by weight, in particular from 5 to 8% by weight, of aldehydes or aldehyde acetals from component group D).

The molar ratio of phenol component C) to aldehyde component D) is preferably in the range from 1:0.9 to 1:4.5, in particular from 1:1 to 1:2.5. Alternatively, instead of components from component groups C) and D), or as a proportion of these, preferably up to 65% by weight, condensation products prepared separately from compounds from component groups C) and D), preferably phenol resols can be used as components C and D.

From 1 to 20% by weight, preferably from 3 to 15% by weight, in particular from 4 to 10% by weight, of alcohols from component group E).

From 0 to 40% by weight, preferably from 1 to 10% by weight, of fatty acids or fatty acid esters from component group F).

From 0 to 30% by weight, preferably from 1 to 25% by weight, in particular from 2 to 10% by weight, of unsaturated monomers from component group G).

From 0 to 30% by weight, preferably from 1 to 25% by weight, in particular from 2 to 10% by weight, of hydrocarbon resins from component group H).

From 0.01 to 5% by weight, preferably from 0.1 to 2% by weight, in particular from 0.3 to 1.5% by weight, calculated as oxides, of monovalent and/or divalent metal compounds from component group I).

From 0.1 to 20% by weight, preferably from 1 to 10% by weight, of carboxylic acids from component group J).

The preparation uses the apparatus customary in the chemistry of natural resins. In this context, the novel products can be prepared by discontinuous or else continuous methods.

It is preferred initially to charge molten natural resin, which is modified with the α,β-olefinically unsaturated carboxylic acid or its anhydride, and is preferably in the temperature range from 120° to 200 ° C. Subsequently, for the purpose of resin modification if desired, fatty acids, ethylenically unsaturated monomers or ethylenically unsaturated hydrocarbon resins or mixtures thereof are added. However, it is also possible initially to charge natural-resin acid and, if desired, the modifying agents together and then to add on maleic anhydride to the natural resin.

The corresponding metal compound or mixtures thereof, polyol, phenol and aldehyde are then introduced. Instead of phenol and aldehyde, or else as a proportion of these, it is also possible to employ a condensation product prepared separately by known methods from phenols and aldehydes in the presence of basic catalysts at a temperature of from 50° to 160 ° C., preferably from 60° to 100° C., at atmospheric pressure or elevated pressure, the product preferably being a phenol resol.

The condensation is then commenced in the temperature range from 130° to 160° C. If the resol is prepared only in situ in the melt from the phenol and aldehyde components, the reaction is preferably carried out under a pressure of up to 10 bar. If a resol is used exclusively, the reaction is preferably carried out at atmospheric pressure.

The mixture is subsequently heated to temperatures of from 200° to 280° C., with distillation of the water of reaction. The progress of the reaction is expediently monitored by determining the acid number. Thus, the acid number of the resin mixture can at the beginning be preferably up to 200 mg of KOH/g of resin, determined by the methods known to those skilled in the art. As the reaction progresses, with elimination of water, the acid number falls continuously. As soon as the acid number has fallen tO values below 100 mg of KOH/g, preferably 80 mg of KOH/g, in particular below 50 mg of KOH/g of solid resin, the carboxylic acid, or its anhydride, from component group J) is added.

The esterification reaction is then continued, with distillation of water, which may also be effected under azeotropic conditions using an inert entrainer, for example xylene, until the reaction of the invention has reached the desired end stage. This stage is then determined expediently by calculating the viscosity values in a solvent, for example toluene. Volatile constituents, including the entrainer, are, if desired, removed from the reaction product by distillation, finally under reduced pressure. After cooling the melt, the end product can be isolated in solid form.

The resins of the invention can also, during or preferably after the actual reaction, be modified further by addition of other compounds. For example, it is possible to dilute the melt with a solvent such as toluene and to isolate the resin in the form of a varnish, with all intermediate states between a solid and a liquid varnish being possible. However, it is also possible to add low molar mass compounds, for example rosin, rosin esters, or polymers, for example phenolic resins, polyesters, alkyd resins, acrylic resins, further phenolic resin-modified rosins, hydrocarbon resins, and mixtures thereof. By means of such a procedure it is possible, for example, to optimize solution viscosities.

Since natural resins of different origin can vary in their composition—for example, they may have a different isomer distribution of the resin acids or contain differing amounts of further terpenes—it is also possible for different product properties, for example in respect of viscosity, to result from the same formulation. The formulation can in this case, however, be adapted to the respective natural resin by slight changes of the concentration of the components.

The molar mass of the novel resins can be determined by gel permeation chromatography of the resin solutions in tetrahydrofuran (THF) on polystyrene foam in a permeation measuring instrument in accordance with known methods. The mean molar mass (weight average $M_w$) of the novel resins according to the measurement results obtained preferably has values of generally $M_w > 5000$ and has no critical upper limit. The mean molar mass $M_w$, however, is particularly preferably within a range from 5000 to 150,000, in particular from 10,000 to 120,000. All references to molar mass are weight average ($M_w$) unless otherwise indicated.

The viscosities are determined, for example, by measuring the 25% strength by weight toluene solutions with a conventional rotary viscometer at 23 ° C. The viscosities are preferably within a range from 3 to 100 mPa.s, preferably from 4 to 50 mPa.s measured at the above conditions.

Natural-resin acid esters modified in accordance with the invention and having a significantly higher weight average molar mass ($M_w$), namely more than 10,000 g/mol, preferably more than 12,000 g/mol, are obtained, in particular, when the water of reaction is removed by azeotropic or vacuum distillation, as compared to a process where no water removal takes place. Raising the molar mass is particularly desirable when binder resins which achieve high viscosities in toluene are to be prepared. Inks formulated with such binders can be made low in solids.

The novel binder resins prepared under the action of lithium compounds as condensation catalysts have the advantageous feature of a viscosity curve on dilution in toluene which in comparison is particularly flat; in other words, their viscosity increases only slightly with increasing resin content. This also makes them superior, in particular, to binder resins of the prior art. By varying the concentration of lithium ions, the viscosity of the resulting resins can be tightly controlled.

On the other hand, the resins prepared under the action of divalent metal cations originating from calcium, magnesium or zinc compounds exhibit particularly good properties in pigment wetting, resulting in inks with high gloss. Consequently, the use of the divalent metal compounds is also preferred.

In some cases, the polybasic carboxylic acids from substance class J) which are used for crosslinking may lead to instances of slight cloudiness in the resin or in its solution in toluene, a phenomenon which is undesirable. The use of 1,2,3,6-tetrahydrophthalic anhydride, in contrast, leads in general to transparent resins and solutions. The use of 1,2,3,6-tetrahydrophthalic anhydride, therefore, is particularly preferred.

The invention additionally provides for the use of the novel resins as binder resins in pigment dispersions and in pigment concentrates and also in toluene-containing printing inks, preferably for the intaglio printing of illustrations.

The resins of the invention have excellent compatibility with other binders, for example with natural-resin acid esters of the prior art, resinates or hydrocarbon resins. Moreover, they possess an excellent wetting capacity for the pigments used in the intaglio printing of illustrations. The toluene-containing intaglio printing inks are generally formulated by the customary methods, in which the appropriate binder resin is dissolved in toluene and the resulting varnish is pigmented, or a preprepared pigment dispersion is diluted with toluene. Additives which can also be used are those which are otherwise customary, for example fillers such as calcium carbonate, or surfactants for improving the pigment dispersion, such as lecithin, or waxes for improving the abrasion resistance.

The invention is illustrated in more detail by the following examples but without being limited by them. The parts and percentages given in the examples are by weight unless otherwise indicated. All temperatures for viscosity measurement are at 23° C., unless otherwise indicated. $M_w$ denotes weight-average molar mass in g/mol.

EXAMPLE 1

967 g of commercial rosin, which is also referred to as natural resin or natural-resin acid, and 48 g of maleic anhydride are heated at 160° C. for one hour in a heatable 2 l multi-neck flask fitted with a stirrer, thermometer, dropping funnel, reflux condenser and filling tube. Then, at this temperature, 2.5 g of lithium hydroxide, 133 g of pentaerythritol and 16 g of glycerol are added. Subsequently, 74 g of an aqueous phenol-formaldehyde condensation product (70% strength in water, viscosity 350 mPa.s) and 67 g of an aqueous p-t-butylphenol-formaldehyde condensation product (70% strength in water, viscosity 250 mPa.s) are added dropwise over the course of one hour. Water begins to distil off during this procedure. The mixture is then heated to 260° C. with continual distillation of water. As soon as the acid number has dropped below 35 mg of KOH/g of resin, 22 g of 1,2,3,6-tetrahydrophthalic anhydride are added to the batch. Stirring is continued for one hour and a vacuum of 100 mbar is then applied for 1.5 h in order to remove volatile constituents. After releasing the vacuum with nitrogen, 1130 g of a brittle, pulverizable resin are obtained having a softening point of 146° C. and an acid number of 21 mg of KOH/g of resin. A 25% strength solution in toluene has a viscosity of 18 mPa.s, and a 50% strength solution a viscosity of 2350 mPa.s, at 23° C. A mean molar mass Mw of 98,500 g/mol is determined by gel permeation chromatography. The reaction time for the preparation is 11 hours.

EXAMPLE 2

The procedure of Example 1 is repeated except that, instead of 1,2,3,6-tetrahydrophthalic anhydride, 16 g of succinic anhydride are used. Yield: 1124 g; m.p.: 142° C.; viscosity (50% strength in toluene): 1960 mPa.s; viscosity (25% strength in toluene): 14 mPa.s; $M_w$: 67,300 g/mol.

EXAMPLE 3

The procedure of Example 1 is repeated except that, instead of 1,2,3,6-tetrahydrophthalic anhydride, 16 g of adipic acid are used. Yield: 1128 g; m.p.: 142° C.; viscosity 50% strength in toluene): 1850 mPa.s; viscosity (25% strength in toluene): 11 mPa.s; $M_w$: 52,400 g/mol.

EXAMPLE 4

The procedure of Example 1 is repeated except that, instead of 1,2,3,6-tetrahydrophthalic anhydride, 48 g of maleopimaric acid are used. Yield: 1154 g; m.p.: 144° C.; viscosity (50% strength in toluene): 2480 mPa.s; viscosity (25% strength in toluene): 14 mPa.s; $M_w$: 59,200 g/mol.

EXAMPLE 5

The procedure of Example 1 is repeated except that, instead of lithium hydroxide, 4.2 g of sodium hydroxide are used. Yield: 1124 g; m.p.: 142° C.; viscosity (50% strength in toluene): 760 mPa.s; viscosity (25% strength in toluene): 7 mPa.s; $M_w$: 24,950 g/mol.

EXAMPLE 6

The procedure of Example 1 is repeated except that, instead of lithium hydroxide, 25 g of zinc oxide and, instead of tetrahydrophthalic anhydride, 80 g of maleopimaric acid are used. Yield: 1181 g; m.p.: 142° C.; viscosity (50% strength in toluene): 3390 mPa.s; viscosity (25% strength in toluene): 7 mPa.s; $M_w$: 14,980 g/mol.

EXAMPLE 7

The procedure of Example 1 is repeated except that, instead of lithium hydroxide, 6.25 g of magnesium oxide and, instead of 1,2,3,6-tetrahydrophthalic anhydride, 60 g of maleopimaric acid are used. Yield: 1165 g; m.p.: 148° C.; viscosity (25% strength in toluene): 12 mPa.s.

EXAMPLE 8

The procedure of Example 1 is repeated except that, instead of lithium hydroxide, 7.7 g of calcium hydroxide and, instead of 1,2,3,6-tetrahydrophthalic anhydride, 22 g of adipic acid are used. Yield: 1129 g; m.p.: 142° C.; viscosity (50% strength in toluene): 270 mPa.s; viscosity (25% strength in toluene): 7 mPa.s; $M_w$: 13,230 g/mol.

EXAMPLE 9

The procedure of Example 1 is repeated except that, instead of lithium hydroxide, 7.7 g of calcium hydroxide and 23 g of 1,2,3,6-tetrahydrophthalic anhydride are used. Yield: 1131 g; m.p.: 145° C.; viscosity (50% strength in toluene): 680 mPa.s; viscosity (25% strength in toluene): 7 mPa.s; $M_w$: 15,000 g/mol.

EXAMPLE 10

724 g of commercial rosin, 230 g of a commercial hydrocarbon resin (®Escorez 8190, manufacturer Exxon)

and 48 g of maleic anhydride are heated at 160° C. for one hour in a heatable 2 l multi-neck flask fitted with a stirrer, thermometer, dropping funnel, reflux condenser and filling tube. Then, at this temperature, 2.5 g of lithium hydroxide, 133 g of pentaerythritol and 16 g of glycerol are added. Subsequently, 74 g of an aqueous phenol-formaldehyde condensation product (70% strength in water, viscosity 350 mPa.s) and 67 g of an aqueous p-t-butylphenol-formaldehyde condensation product (70% strength in water, viscosity 250 mPa.s) are added dropwise over the course of one hour. Water begins to distil off during this procedure. The mixture is then heated to 260° C. with continual distillation of water. As soon as the acid number has dropped below 35 mg of KOH/g of resin, 10 g of 1,2,3,6-tetrahydrophthalic anhydride are added to the batch. Stirring is continued for one hour and a vacuum of 100 mbar is then applied for 1.5 h in order to remove volatile constituents. After releasing the vacuum with nitrogen, 1108 g of a brittle, pulverizable resin are obtained having a softening point of 154° C. and an acid number of 18 mg of KOH/g of resin. A 25% strength solution in toluene has a viscosity of 19 mPa.s at 23° C. The reaction time for the preparation is 9 hours.

EXAMPLE 11

965 g of commercial rosin, 37 g of maleic anhydride and 30 g of styrene are heated at 160° C. for half an hour in a heatable 2 l multi-neck flask fitted with a stirrer, thermometer, dropping funnel, reflux condenser and filling tube. Subsequently, the temperature is increased slowly to 200° C. over the course of a further half an hour. Then, at this temperature, 2.5 g of lithium hydroxide and 148 g of pentaerythritol are added. Subsequently, 74 g of an aqueous phenol-formaldehyde condensation product (70% strength in water, viscosity 350 mPa.s) and 67 g of an aqueous p-t-butylphenol-formal-dehyde condensation product (70% strength in water, viscosity 250 mPa.s) are added dropwise over the course of one hour. Water begins to distill off during this procedure. The mixture is then heated to 260° C. with continual distillation of water. As soon as the acid number has dropped below 35 mg of KOH/g of resin, 22 g of 1,2,3,6-tetrahydrophthalic anhydride are added to the batch. Stirring is continued for one hour and a vacuum of 100 mbar is then applied for 1.5 h in order to remove volatile constituents. After releasing the vacuum with nitrogen, 1078 g of a brittle, pulverizable resin are obtained having a softening point of 138° C. and an acid number of 16 mg of KOH/g of resin. A 25% strength solution in toluene has a viscosity of 8 mPa.s at 23° C. The reaction time for the preparation is 9 hours.

EXAMPLE 12

2428 g of commercial rosin together with 42 g of maleic anhydride are heated at 160° C. for half an hour in a heatable 6 l multi-neck flask fitted with a stirrer, thermometer, dropping funnel, reflux condenser and filling tube. The acid formed is then heated at 130° C. for two hours together with 40.5 g of calcium hydroxide, 214 g of glycerol, 314 g of nonylphenol, 234 g of bisphenol A and 208 g of formaldehyde, a pressure of 1.5 bar becoming established in the sealed vessel. The pressure is then released and the temperature is increased to 250° C. with distillation, the water of reaction formed being distilled off azeotropically with xylene from 200° C. Then 200 g of maleopimaric acid are added. Stirring is continued for one hour and a vacuum of 100 mbar is then applied for ten minutes in order to remove volatile constituents. After releasing the vacuum with nitrogen, 3092 g of a brittle, pulverizable resin are obtained having a softening point of 134 ° C. and an acid number of 26 mg of KOH/g of resin. A 25% strength solution in toluene has a viscosity of 8 mPa-s, and a 50 strength by weight solution has a viscosity of 965 mPa.s, at 23° C.

EXAMPLE 13

The procedure of Example 1 is repeated except that, in addition to lithium hydroxide, 2 g of sodium hydroxide and 5 g of linseed oil are used. Yield: 1157 g; m.p.: 145° C.; viscosity (50% strength in toluene): 2680 mPa.s; viscosity (25% strength in toluene): 17 mPa.s; $M_w$: 115,000 g/mol.
Performance comparison Using in each case the binder resins of Example 11 (ink A) and a commercial, phenolic resin-modified natural-resin acid ester (zinc content, determined as ZnO, 4.5% by weight, viscosity (25% strength in toluene) 4.5 mPa.s at 23° C. (ink B)), customary methods are used to prepare, by dispersion of a mixture of 24 g of binder resin 9 g of ®Pigment Litholrubin (red pigment, BASF AG) and 67 g of toluene, 5 inks for the intaglio printing of illustrations, and highly absorbent natural paper is printed by the intaglio printing process.

The gloss of the prints, which should be as high as possible for a good printing result, is then measured using a Lange laboratory reflectometer at an angle of incidence of 60°.

The strike-through of the inks to the reverse side of the material being printed, which should be as weak minimal as possible for good printing behavior, is assessed visually and rated on a scale from 1 to 6. In this scale, 1 denotes no strike-through to the reverse side of the material being printed and 6 denotes disadvantageous maximum strike-through to the reverse side of the printed material.

The ink formulated with the resin according to the invention gives substantially glossier prints than the inks formulated with the prior art resins.

|  | Ink A | Ink B | Ink C |
| --- | --- | --- | --- |
| Gloss (%) | 65 | 59 | 60 |
| Strike-through | 2 | 3 | 2 |

By dispersion of 12 g of comparison resin 6 g of binder resin of Example 1

9 g of Litholrubin 73 g of toluene, a low-resin ink C is prepared and is compared with the resin-rich ink B as shown above. Despite the 25% by weight reduced resin content, a printing result of similar quality is obtained.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A toluene-soluble modified natural-resin acid ester which is produced by a process which comprises:
    reacting at least one compound selected from each of the groups A-E ahd optionally reacting at least one compound selected from the group consisting of F-H, in the presence of component I, wherein the reaction takes place at a temperature of from 100° to 300° C., with elimination of water, to an acid number of less than 100 mg of KOH/g of resin; and further reacting the resulting products with at least one compound from component group J at a temperature of from 200° to 300° C., wherein component groups A-J are defined as A) natural resins or natural-resin acids, B) α,β-ethylenically unsaturated carboxylic acids or their anhydrides, C) phenols which are polyfunctional with respect to oxo compounds, D) aldehydes or aldehyde acetals, E) alcohols having at least two hydroxyl groups, F) fatty acids or fatty acid esters, G) ethylenically unsaturated monomers, H) ethylenically unsaturated hydrocarbon resins, I) monovalent or divalent metal compounds or mixtures thereof, and J) carboxylic acids or their anhydrides which contain at least two carboxyl groups and are not α,β-ethylenically unsaturated.

2. A modified natural-resin acid ester as claimed in claim 1, which has a weight average ($M_w$) molar mass in the range between 5000 and 150,000 g/mol.

3. A modified natural-resin acid ester as claimed in claim 1, whose 25% strength by weight solution in toluene at 23° C. has a viscosity of between 3 and 100 mPa.s.

4. A modified natural-resin acid ester as claimed in claim 1, which has a weight average molar mass $M_w$ of from 10,000 to 120,000 g/mol.

5. A modified natural-resin acid ester as claimed in claim 1, which has a viscosity in a 25% by weight concentration in toluene and at a temperature of 23° C. of from 4 to 50 mPa.s.

6. A process for the preparation of toluene-soluble modified natural-resin acid esters as claimed in claim 1, which comprises:

reacting at least one compound selected from each of the groups A-E and optionally reacting at least one compound selected from the group consisting of F-H, in the presence of component I, wherein the reaction takes place at a temperature of from 100° to 300° C. with elimination of water, to an acid number of less than 100 mg of KOCH/g of resin; and further reacting the resulting products with at least one compound from component group J at a temperature of from 200° to 330° C., wherein component groups A-J and their amounts are:

from 30 to 95% by weight of component group A which are natural resins or natural-resin acids, from 0.1 to 20% by weight of component group B which are α,β-ethylenically unsaturated carboxylic acids, or their anhydrides, from 1 to 45% by weight of component group C which are phenols which are polyfunctional with respect to oxo compounds, from 1 to 20% by weight of component group D which are aldehydes or aldehyde acetals, wherein component groups C and D may optionally be wholly or partially present as condensation products prepared separately from compounds from component groups B and C, from 1 to 20% by weight of component group E which are alcohols having at least two hydroxyl groups, from 0 to 40% by weight of component group F which are fatty acids or fatty acid esters, from 0 to 30% by weight of component group G which are unsaturated monomers, from 0 to 30% by weight of component group H which are hydrocarbon resins, from 0.01 to 5% by weight, calculated as oxide, of component group I which are monovalent and/or divalent metal compounds, and J) carboxylic acids which contain at least two carboxyl groups and are not α,β-ethylenically unsaturated, or their anhydrides.

7. The process for the preparation of modified natural-resin acid esters, as claimed in claim 6, wherein the metal compound used from component group I) is a lithium compound.

8. The process for the preparation of modified natural-resin acid esters, as claimed in claim 6, wherein the metal compound used from component group I) is a calcium compound, magnesium compound or zinc compound or a mixture thereof.

9. The process for the preparation of modified natural-resin acid esters, as claimed in claim 6, wherein the carboxylic anhydride used from component group J) is 1,2,3,6-tetrahydrophthalic anhydride.

10. The process for the preparation of modified natural-resin acid esters, as claimed in claim 6, wherein the metal compound used from component group I) is a lithium compound and the carboxylic anhydride used from component group J) is 1,2,3,6-tetrahydrophthalic anhydride.

11. The process for the preparation of modified natural-resin acid esters, as claimed in claim 6, wherein the sequence of reaction further comprises:

(1) reacting A and B;

(2) optionally reacting the resulting product from the reaction of A and B obtained from (1), with one or more of F, G, and H, (3) reacting the resulting product from (1) or (2) with components I, E, C and D, and (4) reacting the resulting product from (3) with component J.

12. The process for the preparation of modified natural-resin acid esters, as claimed in claim 6, wherein the sequence of reaction further comprises:

(1) reacting A and B;

(2) reacting C and D;

(3) optionally reacting the resulting product from the reaction of A and B obtained from (1), with one or more of F, G, and H, (4) reacting the resulting product from (1) or (3) with component I, E and the resulting product from (2), and (5) reacting the resulting product from (4) with component J.

13. The process for the preparation of modified natural-resin acid esters, as claimed in claim 6, wherein the sequence of reaction further comprises:

(1) reacting A and B;

(2) reacting the resulting product from the reaction of A and B obtained from (1) with component I, E, C and D, and optionally with one or more of components F, G, and H, (3) reacting the resulting product from (2) with component J.

* * * * *